US009851543B2

(12) United States Patent
Lee et al.

(10) Patent No.: US 9,851,543 B2
(45) Date of Patent: Dec. 26, 2017

(54) PROJECTION LENS ADJUSTMENT MODULE AND PROJECTOR USING THE SAME

(71) Applicants: Sea-Huang Lee, Hsin-Chu (TW); Shyh-Kang Lin, Hsin-Chu (TW); Wen-Ching Ho, Hsin-Chu (TW)

(72) Inventors: Sea-Huang Lee, Hsin-Chu (TW); Shyh-Kang Lin, Hsin-Chu (TW); Wen-Ching Ho, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 224 days.

(21) Appl. No.: 14/673,890

(22) Filed: Mar. 31, 2015

(65) Prior Publication Data

US 2015/0378135 A1      Dec. 31, 2015

(30) Foreign Application Priority Data

Jun. 27, 2014   (CN) .......................... 2014 1 0301534

(51) Int. Cl.
| G02B 3/00 | (2006.01) |
| G02B 9/00 | (2006.01) |
| G02B 13/16 | (2006.01) |
| G03B 21/14 | (2006.01) |
| G03B 21/28 | (2006.01) |

(52) U.S. Cl.
CPC ........... *G02B 13/16* (2013.01); *G03B 21/142* (2013.01); *G03B 21/28* (2013.01)

(58) Field of Classification Search
CPC ........ G02B 13/16; G02B 13/18; G02B 13/22; G02B 13/143; G03F 7/70241

USPC .................................................. 359/642, 649
See application file for complete search history.

(56) References Cited

U.S. PATENT DOCUMENTS 6,246,204 B1 *   6/2001   Ebihara et al. ............... 318/649
2007/0086093 A1   4/2007   Hung et al.

FOREIGN PATENT DOCUMENTS

| CN | 2804888 | 8/2006 |
| CN | 101025465 | 8/2007 |
| CN | 101261359 | 9/2008 |
| CN | 201628800 | 11/2010 |

(Continued)

OTHER PUBLICATIONS

"Office Action of China Counterpart Application," dated Oct. 10, 2016, p. 1-p. 5.

*Primary Examiner* — James Greece
(74) *Attorney, Agent, or Firm* — JCIPRNET (57) ABSTRACT

A projection lens adjustment module applicable to a projection lens is provided. The projection lens includes a first assembly and a second assembly. The projection lens adjustment module includes a flexible connection line, an adjusting element and a driving mechanism. The flexible connection line has a first end and a second end opposite to each other. The adjusting element is connected to the first end. The driving mechanism is connected to the second assembly and the second end. When the adjusting element drives the first end to move along a first direction thereby leading the second end to move along a second direction non-parallel to the first direction, the second end drives the second assembly to move along an optical axis direction of the projection lens relative to the first assembly through the driving mechanism.

10 Claims, 4 Drawing Sheets

(56) References Cited

FOREIGN PATENT DOCUMENTS

| | | |
|---|---|---|
| CN | 102262276 | 11/2011 |
| CN | 102809799 | 12/2012 |
| EP | 2219071 | 8/2010 |
| TW | 277454 | 6/1996 |
| TW | 200912505 | 3/2009 |

\* cited by examiner

PROJECTION LENS ADJUSTMENT MODULE AND PROJECTOR USING THE SAME

CROSS-REFERENCE TO RELATED APPLICATION

This application claims the priority benefit of Chinese application serial no. 201410301534.8, filed on Jun. 27, 2014. The entirety of the above-mentioned patent application is hereby incorporated by reference herein and made a part of this specification.

BACKGROUND OF THE INVENTION

Field of the Invention

The invention relates to an adjustment module and an optical device, and more particularly, to a projection lens adjustment module and a projector.

Description of Related Art

A projector is a display device capable of enlarging and projecting frames into a projection surface. The imaging principle of projectors is to convert an illumination beam generated by a light source into an image beam via a light valve, and then to project the image beam onto a projection surface (such as a screen or a wall) through a projection lens so as to form an image. With advancement in projection techniques and reduction in manufacturing cost of projection devices, applications of projection devices have been gradually expanded from commercial use to household use.

In general, the projector provides a focus ring for a user to adjust the focus of a projection lens. Conventionally, the focus ring is disposed to protrude from the top of the projector, in order for the user to focus the projection lens at the top of the projector in a manual operation manner. Under such configuration with the focus ring, if the projector is designed to have the projection beam transmitting towards the top of the projector via the reflection of a reflective mirror after being projected out of the projection lens, the projection beam will easily be blocked as the user operates the focus ring resulting in the incomplete of projection frames. As such, the accuracy and convenience of focusing are both affected, such as a low-f-number projector. In addition, some conventional projectors are configured to dispose the focus ring at the bottom of the projector. Although such design may prevent the projection beam being blocked as the user operates the focus ring, the projector requires to be lifted from a table surface in order to operate the focus ring. By this way, the projection frames are shifted, which may not be facilitated to adjust the focal length of the projection lens.

China Patent Publication no. CN 101261359 discloses a projector, which allows the user to operate the knob member in an up-and-down moving manner so as to adjust a focusing condition of the projection lens unit. China Patent Publication no. CN 2804888Y discloses a lens module structure, which employs the step motor to drive the rack bar to move so as to drive the rotation seat to adjust the focal length of the projection lens. China Patent Publication no. CN 101025465A discloses a projector, which the turn table thereof is disposed at the top of the projector where the first gear part on the turn table is engaged with the second gear part on the lens barrel, such that the user is capable of rotating the turn table to drive the lens barrel to operate, so as to adjust the focus of the projection lens.

The information disclosed in this BACKGROUND section is only for enhancement of understanding of the BACKGROUND of the described technology and therefore it may contain information that does not form the prior art that is already known to a person of ordinary skill in the art. Further, the information disclosed in the BACKGROUND section does not mean that one or more problems to be resolved by one or more embodiments of the invention was acknowledged by a person of ordinary skill in the art.

SUMMARY OF THE INVENTION

The invention is directed to a projection lens adjustment module, which is capable of adjusting a focal length of a projection lens accurately and smoothly.

The invention is directed to a projector, where a projection lens adjustment module thereof is capable of adjusting a focal length of a projection lens accurately and smoothly.

Other objectives and advantages of the invention should be further indicated by the disclosures of the invention, and omitted herein for simplicity.

To achieve the above-mentioned or other objectives, one embodiment of the invention provides a projection lens adjustment module applicable to a projection lens. The projection lens includes a first assembly and a second assembly. The projection lens adjustment module includes a flexible connection line, an adjusting element and a driving mechanism. The flexible connection line has a first end and a second end opposite to each other. The adjusting element is connected to the first end. The driving mechanism is connected to the second assembly and the second end. When the adjusting element drives the first end to move along a first direction thereby leading the second end to move along a second direction non-parallel to the first direction, the second end drives the second assembly to move along an optical axis direction of the projection lens relative to the first assembly through the driving mechanism.

In an embodiment of the invention, the first direction is perpendicular to the second direction.

In an embodiment of the invention, the optical axis direction of the projection lens is parallel to the first direction.

In an embodiment of the invention, the projection lens is disposed within a chassis, the adjusting element is disposed at the chassis and adapted to slide along the first direction relative to the chassis.

In an embodiment of the invention, the projection lens is disposed within a chassis, the driving mechanism includes a first rack and a second rack. The first rack is connected to the second end. The first rack is disposed within the chassis and adapted to slide along the second direction relative to the chassis, the second rack is disposed at the second assembly and engaged with the first rack.

In an embodiment of the invention, the projection lens includes a focus ring disposed at the second assembly, the second rack is an arc rack and fixed at an outer wall of the focus ring.

In an embodiment of the invention, the projection lens adjustment module further includes a guiding tube. The guiding tube includes a first extension segment, a second extension segment and a bending segment. The bending segment is connected between the first extension segment and the second extension segment. The first extension segment extends along the first direction and faces towards the adjusting element, the second extension segment extends along the second direction and faces towards the driving mechanism. The flexible connection line is disposed through the guiding tube and passes through the first extension segment, the bending segment and the second extension segment in sequence.

In an embodiment of the invention, the adjusting element has a pillar, the flexible connection line has a sleeve ring at the first end, and the sleeve ring is fitted around the pillar.

In an embodiment of the invention, the projection lens adjustment module is applicable to a projector. The projection lens is disposed within a chassis of the projector. The chassis has a top portion and a side portion. A projection beam is adapted to project out from the projection lens to transmit towards the top portion, and the adjusting element is disposed at the side portion of the chassis.

In an embodiment of the invention, the projector includes a reflecting element. The reflecting element is disposed within the chassis. The projection beam is adapted to transmit towards the top portion of the chassis via a reflection of the reflecting element.

To achieve the above-mentioned or other objectives, one embodiment of the invention provides a projector including a light source, a light valve, a projection lens and a projection lens adjustment module. The light source is adapted to provide an illumination beam. The light valve is located on a transmission path of the illumination beam and adapted to convert the illumination beam into an image beam. The projection lens is located on a transmission path of the image beam and adapted to convert the image beam into a projection beam. The projection lens includes a first assembly and a second assembly. The projection lens adjustment module includes a flexible connection line, an adjusting element and a driving mechanism. The flexible connection line has a first end and a second end opposite to each other. The adjusting element is connected to the first end. The driving mechanism is connected to the second assembly and the second end. When the adjusting element drives the first end to move along a first direction thereby leading the second end to move along a second direction non-parallel to the first direction, the second end drives the second assembly to move along an optical axis direction of the projection lens relative to the first assembly through the driving mechanism.

In view of the above, the embodiments of the invention may have at least one of the following advantages. In the embodiments of the invention, the two opposite ends of the flexible connection line are respectively connected to the adjusting element and the driving mechanism, the user then is capable of operating the adjusting element to actuate through the flexible connection line drives the driving mechanism, such that the projection lens is driven by the driving mechanism to adjust a focal length thereof. The direction of the flexible connection line driven by the adjusting element (that is, the first direction) is designed to be non-parallel to the direction of the flexible connection line driving the driving mechanism (that is, the second direction), so that the adjusting element can be disposed at the side portion of the projector or other appropriate locations via the extension and the bending of the flexible connection line, according to the design requirement. Accordingly, the adjusting element does not have to be disposed at the top portion of the projector, so as to avoid blocking the projection beam transmitted from the projection lens towards the top portion of the projector as the user operates the adjusting element. Let the user adjust the focal length of the projection lens accurately and smoothly through a complete frame being projected.

Other features and advantages of the invention will be further understood from the further technological features disclosed by the embodiments of the invention wherein there are shown and described embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
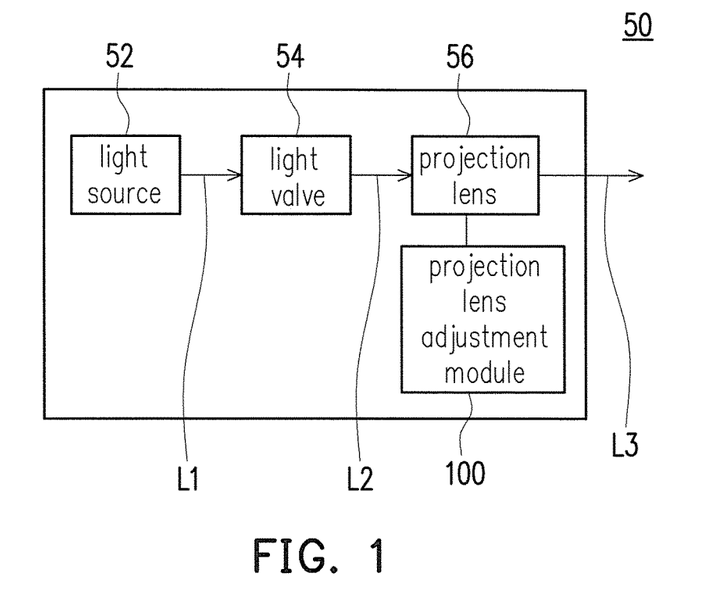
FIG. 1 is a schematic view illustrating a projector according to an embodiment of the invention.

FIG. 1 is a schematic view illustrating a projector according to an embodiment of the invention. Referring to FIG. 1, the projector 50 includes a light source 52, a light valve 54, a projection lens 56 and a projection lens adjustment module 100. The light source 52 is adapted to provide an illumination beam L1. The light valve 54 is located on a transmission path of the illumination beam L1, and is adapted to convert the illumination beam L1 into an image beam L2. The projection lens 56 is located on a transmission path of the image beam L2, and is adapted to convert the image beam L2 into a projection beam L3. The projection lens adjustment module 100 is connected to the projection lens 56, and is configured to adjust a focal length of the projection lens 56. The light source 52 may be a laser diode, a light emitting diode (LED), an ultra high performance (UHP) lamp or a metal halide lamp; the light valve 54 may be a digital micro-mirror device (DMD), a liquid crystal display panel, a liquid-crystal-on-silicon panel or other appropriate spatial light modulators (SLM), although the invention is not limited thereto.

Figure 2:
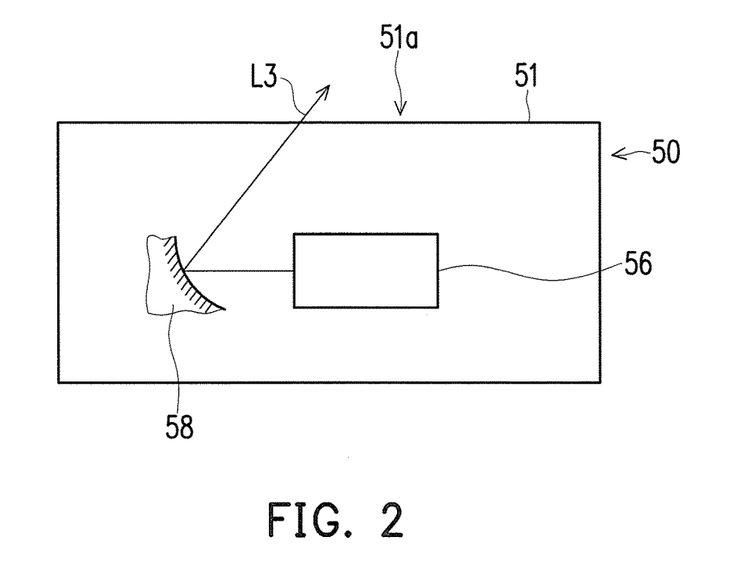
FIG. 2 is a schematic side view illustrating the projector depicted in FIG. 1.

FIG. 2 is a schematic side view illustrating the projector depicted in FIG. 1. Referring to FIG. 2, the projector 50 includes a chassis 51, where the chassis 51 has a top portion 51a. Besides, the projector 50 includes a reflecting element 58 disposed within the chassis 51, and the reflecting element 58 is located on a transmission path of the projection beam L3. The projection beam L3, after being projected out of the projection lens 56, transmits towards the top portion 51a through the reflection of the reflecting element 58 to project out of the chassis 51, for instance. The reflecting element 58 may be a planar reflective mirror, a concave reflective mirror, a convex reflective mirror or a free form reflective mirror, although the invention is not limited thereto.

Figure 3:
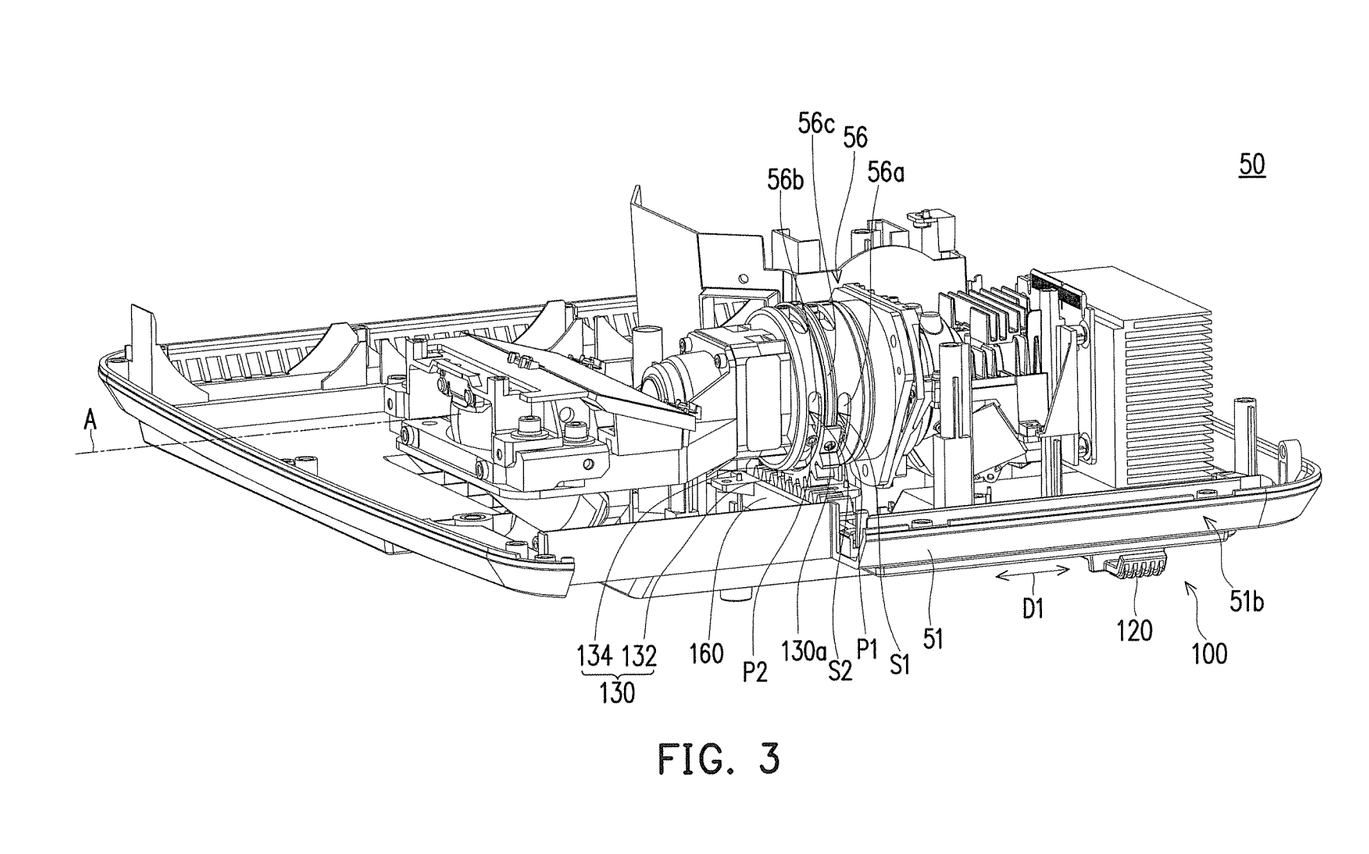
FIG. 3 is a perspective view illustrating a part of components in the projector depicted in FIG. 1.
Figure 4:
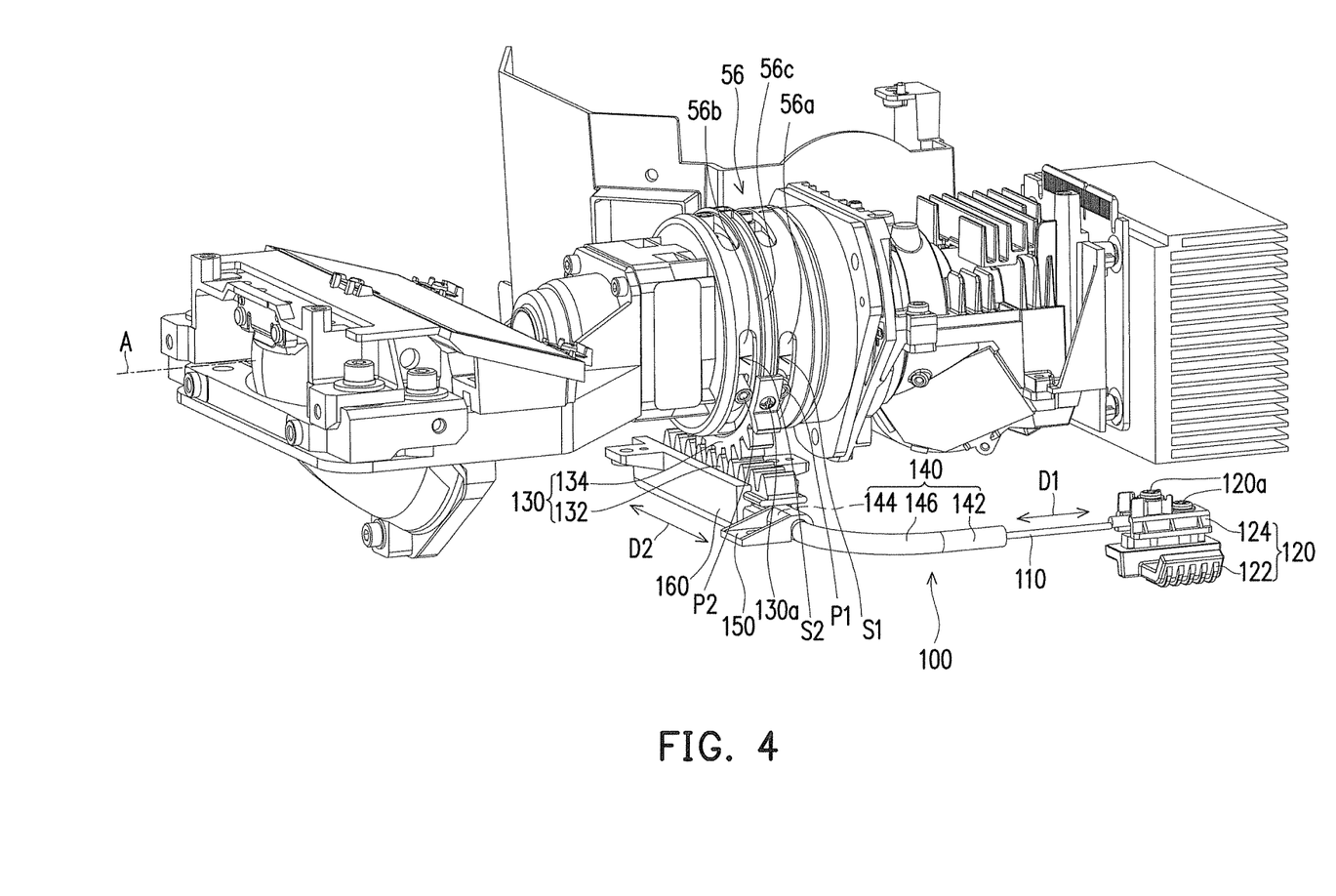
FIG. 4 is a perspective view illustrating a part of components in the projector depicted in FIG. 3.
Figure 5:
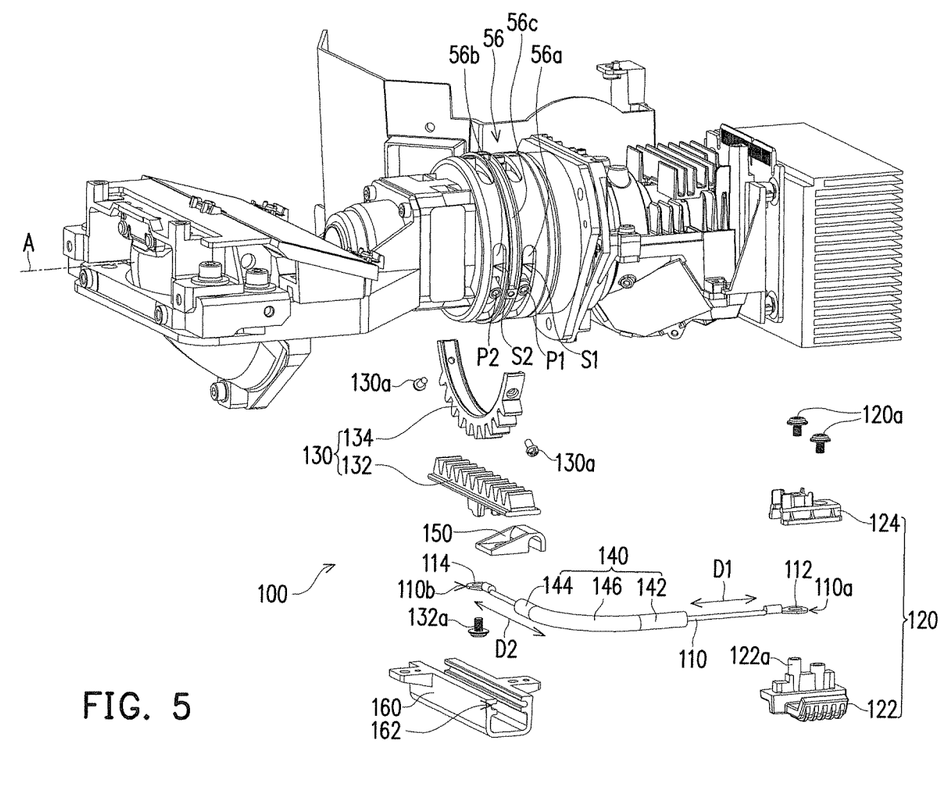
FIG. 5 is an explosive view illustrating a projection lens adjustment module in the projector depicted in FIG. 4.

FIG. 3 is a perspective view illustrating a part of components in the projector depicted in FIG. 1. FIG. 4 is a perspective view illustrating a part of components in the projector depicted in FIG. 3. FIG. 5 is an explosive view illustrating a projection lens adjustment module in the projector depicted in FIG. 4. In detail, referring to FIG. 3 through FIG. 5, the projection lens 56 is disposed within the chassis 51 and includes a first assembly 56a and a second assembly 56b. The first assembly 56a and the second assembly 56b may be lens barrels configured to accommodate lenses, that is, the first assembly 56a may be a first lens barrel to accommodate at least one lens and the second assembly 56b may be a second lens barrel to accommodate at least one lens, for instance. The projection lens adjustment module 100 includes a flexible connection line 110, an adjusting element 120 and a driving mechanism 130. The flexible connection line 110 may be a steel wire, and has a first end 110a and a second end 110b opposite to each other. The adjusting element 120 is disposed at the chassis 51, and adapted to slide along a first direction D1 relative to the chassis 51. The adjusting element 120 is connected to the first end 110a of the flexible connection line 110, while the driving mechanism 130 is connected to the second assembly 56b and the second end 110b of the flexible connection line 110.

When the adjusting element 120 drives the first end 110a of the flexible connection line 110 to move along the first direction D1 relative to the chassis 51, the second end 110b of the flexible connection line 110 is led to move along the second direction D2 non-parallel to the first direction D1. The second end 110b of the flexible connection line 110 drives the second assembly 56b to move along an optical axis direction of the projection lens 56 relative to the first assembly 56a through the driving mechanism 130.

Under the afore-described configuration of the projection lens adjustment module 100, the flexible connection line 110 is connected between the adjusting element 120 and the driving mechanism 130, the user then is capable of operating the adjusting element 120 disposed at the chassis 51 to actuate through the flexible connection line 110 drives the driving mechanism 130, such that the projection lens 56 is driven by the driving mechanism 130 to adjust the focusing condition thereof. The direction of the flexible connection line 110 driven by the adjusting element 120 (that is, the first direction D1) is designed to be non-parallel to the direction of the flexible connection line 110 driving the driving mechanism 130 (that is, the second direction D2), so that the adjusting element 120 can be disposed at the side portion 51b of the chassis 51 of the projector 50 (as depicted in FIG. 3) or other appropriate locations via the extension and the bending of the flexible connection line 110, according to the design requirement. Accordingly, the adjusting element 120 does not have to be disposed at the top portion 51a of the chassis 51 of the projector 50 depicted in FIG. 2, so as to avoid blocking the projection beam L3 transmitted from the projection lens 56 towards the top portion 51a of the chassis 51 as the user operates the adjusting element 120, which allows the user to adjust the focal length of the projection lens 56 accurately and smoothly through a complete frame being projected.

In the embodiment, the optical axis direction A of the projection lens 56 for instance may be parallel to the direction of the flexible connection line 110 driven by the adjusting element 120 (namely, the first direction D1), in order for the user to linearly operate the adjusting element 120 to adjust the focusing along the optical axis direction A of the projection lens 56 in a more instinctive manner. Besides, the direction of the flexible connection line 110 driven by the adjusting element 120 (namely, the first direction D1) may be perpendicular to the direction of the flexible connection line 110 driving the driving mechanism 130 (namely, the second direction D2), although the invention is not limited thereto. In other embodiments, the first direction D1 may be non-parallel to the optical axis direction A, and the first direction D1 may be non-perpendicular to the second direction D2.

Referring to FIG. 3 through FIG. 5, the driving mechanism 130 of the embodiment includes a first rack 132 and a second rack 134. The first rack 132 is disposed within the chassis 51 and adapted to linearly slide along the second direction D2 relative to the chassis 51. The first rack 132 is connected to the second end 110b of the flexible connection line 110. The second rack 134 is disposed at the second assembly 56b and engaged with the first rack 132. The adjusting element 120 drives the first rack 132 to move along the second direction D2 via the flexible connection line 110. The first rack 132 through being engaged with the second rack 134 enables the second rack 134 to drive the second assembly 56b along the optical axis direction A of the projection lens 56 relative to the first assembly 56a, so as to perform the focusing of the projection lens 56.

To be more specific, the projection lens 56 includes a focus ring 56c disposed at the second assembly 56b. The second assembly 56b may be a lens barrel configured to accommodate lenses, while the focus ring 56c is disposed at the outer surface of the lens barrel. The second rack 134 may be an arc rack and coordinated with the shape of the focus ring 56c to be fixed at the outer wall of the focus ring 56c, in which the second rack 134 may be fastened to the outer wall of the focus ring 56c via a fastening element 130a, or may be fixed at the outer wall of the focus ring 56c via other appropriate methods, although the invention is not limited thereto. The focus ring 56c has a guiding groove S1 and a guiding groove S2, in which a protrusion P1 on the first assembly 56a is inserted into the guiding groove S1 so as to slide in the guiding groove S1, and a protrusion P2 on the second assembly 56b is inserted into the guiding groove S2 so as to slide in the guiding groove S2, such that the focus ring 56c is capable of taking the optical axis of the projection lens as a center to rotate relative to the first assembly 56a and the second assembly 56b. The extending direction of the guiding groove S2 is slightly tilted relative to the guiding groove S1, and thus when the first rack 132 is linearly moved and engaged with the second rack 134 thereby rotating the second rack 134 to drive the focus ring 56c taking the optical axis of the projection lens 56 as the center to rotate, the inner wall of the guiding groove S2 may push the protrusion P2 along the optical axis direction A to lead the second assembly 56b to move along the optical axis direction A relative to the first assembly 56a, in order to achieve the effect of adjusting focal length.

Referring to FIG. 4 and FIG. 5, the adjusting element 120 of the embodiment includes a push button 122 and a fixing member 124. The push button 122 of the adjusting element 120 has a pillar 122a, and the flexible connection line 110 has a sleeve ring 112 at the first end 110a. The sleeve ring 112 is fitted around the pillar 122a, the fixing member 124 is fastened to the push button 122 via a fastening element 120a, and to limit the sleeve ring 112 being located between the push button 122 and the fixing member 124 so that the sleeve ring 112 may not fall off from the pillar 112a. In other embodiments, the pillar 122a may be disposed at the fixing member 124 or the first end 110a of the flexible connection line 110 may be fixed at the adjusting element 120 via other appropriate methods, although the invention is not limited thereto. As shown in FIG. 3, the chassis 51 of the projector 50 in the embodiment has a trough (not labeled), in which the trough extends along the first direction D1 to be disposed at the side portion 51b of the chassis 51. The push button 122 is partially exposed out of the trough of the side portion 51b, and is capable of sliding along the trough relative to the chassis 51, where the user adjusts the focal length of the projection lens 56 by pushing the push button 122 partially exposed out of the trough.

Referring to FIG. 5, the flexible connection line 110 of the embodiment has a sleeve ring 114 at the second end 110b, a fastening element 132a passes through the sleeve ring 114 and is fastened to the first rack 132 and to limit the sleeve ring 114 of the second end 110b being located at the first rack 132. The projection lens adjustment module 100 further includes an assembling member 160. The assembling member 160 is fixed at the chassis 51 as shown in FIG. 3 and has a chute 162. The first rack 132 is linearly and slideably disposed at the chute 162 of the assembling member 160, so that the first rack 132 may slide along the second direction D2 relative to the chassis 51.

Referring to FIG. 4 and FIG. 5, the projection lens adjustment module 100 of the embodiment further includes a guiding tube 140 and an assembling member 150. The guiding tube 140 includes a first extension segment 142, a second extension segment 144 and a bending segment 146. The bending segment 146 is connected between the first extension segment 142 and the second extension segment 144, in which the first extension segment 142 extends along the first direction D1 and faces towards the adjusting element 120, and the second extension segment 144 extends along the second direction D2 and faces towards the first rack 132 of the driving mechanism 130. The assembling member 150 is fixed at the chassis 51 as shown in FIG. 3, and is configured to fix the guiding tube 140 in the chassis 51. The flexible connection line 110 is disposed through the guiding tube 140 and passes through the first extension segment 142, the bending segment 146 and the second extension segment 144 in sequence. In the embodiment, the line body between the first end 110a and the second end 110b of the flexible connection line 110 is disposed through the guiding tube 140. When the user pushes the adjusting element 120 along the first direction D1, the flexible connection line 110 slides relative to the guiding tube 140 fixed at the chassis 51, so as to actuate smoothly via the guidance of the guiding tube 140.

To sum up, the embodiments of the invention may have at least one of the following advantages. In the aforedescribed embodiments of the invention, the two opposite ends of the flexible connection line are respectively connected to the adjusting element and the driving mechanism, the user then is capable of operating the adjusting element to actuate through the flexible connection line drives the driving mechanism, such that the projection lens is driven by the driving mechanism to adjust a focal length thereof. The direction of the flexible connection line driven by the adjusting element (that is, the first direction) is designed to be non-parallel to the direction of the flexible connection line driving the driving mechanism (that is, the second direction), so that the adjusting element can be disposed at the side portion of the projector or other appropriate locations via the extension and the bending of the flexible connection line, according to the design requirement. As such, the spatial configuration either on the exterior or the interior of the projector becomes more flexible. Accordingly, the adjusting element does not have to be disposed at the top portion of the projector, so as to avoid blocking the projection beam transmitted from the projection lens and reflected by the reflecting element towards the top portion of the projector as the user operates the adjusting element, which allows the user to adjust the focal length of the projection lens accurately and smoothly through a complete frame being projected. In addition, the direction of the flexible connection line driven by the adjusting element (namely, the first direction) is designed to be parallel to the optical axis direction of the projection lens, in order for the user to operate the adjusting element to adjust the focusing along the optical axis direction of the projection lens in a more instinctive manner.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims. Moreover, "first", "second", etc. mentioned in the specification and the claims are merely used to name the elements and should not be regarded as limiting the upper or lower bound of the number of the components/devices.

What is claimed is:

1. A projection lens adjustment module applicable to a projection lens, the projection lens comprising a first assembly and a second assembly, and the projection lens adjustment module comprising:
    a flexible connection line, having a first end and a second end opposite to each other;
    an adjusting element, connected to the first end; and
    a driving mechanism, connected to the second assembly and the second end, wherein when the adjusting element drives the first end of the flexible connection line to move along a first direction thereby leading the second end of the flexible connection line to move along a second direction non-parallel to the first direction, the second end of the flexible connection line drives the second assembly of the projection lens to move along an optical axis direction of the projection lens relative to the first assembly through the driving mechanism.

2. The projection lens adjustment module according to claim 1, wherein the first direction is perpendicular to the second direction.

3. The projection lens adjustment module according to claim 1, wherein the optical axis direction of the projection lens is parallel to the first direction.

4. The projection lens adjustment module according to claim 1, wherein the projection lens is disposed within a chassis, and the adjusting element is disposed at the chassis and adapted to slide along the first direction relative to the chassis.

5. The projection lens adjustment module according to claim 1, wherein the projection lens is disposed within a chassis, and the driving mechanism comprises a first rack and a second rack, wherein the first rack is connected to the second end, the first rack is disposed within the chassis and adapted to slide along the second direction relative to the chassis, and the second rack is disposed at the second assembly and engaged with the first rack.

6. The projection lens adjustment module according to claim 5, wherein the projection lens comprises a focus ring disposed at the second assembly, and the second rack is an arc rack and fixed at an outer wall of the focus ring.

7. The projection lens adjustment module according to claim 1, further comprising a guiding tube, wherein the guiding tube comprises a first extension segment, a second extension segment and a bending segment, the bending segment is connected between the first extension segment and the second extension segment, the first extension segment extends along the first direction and faces towards the adjusting element, the second extension segment extends along the second direction and faces towards the driving mechanism, and the flexible connection line is disposed through the guiding tube and passes through the first extension segment, the bending segment and the second extension segment in sequence.

8. The projection lens adjustment module according to claim 1, wherein the adjusting element has a pillar, the flexible connection line has a sleeve ring at the first end, and the sleeve ring is fitted around the pillar.

9. The projection lens adjustment module according to claim 1, wherein the projection lens adjustment module is applicable to a projector, the projection lens is disposed within a chassis of the projector, the chassis has a top portion and a side portion, a projection beam is adapted to project out from the projection lens to transmit towards the top portion, and the adjusting element is disposed at the side portion of the chassis.

10. The projection lens adjustment module according to claim 9, wherein the projector comprises a reflecting element, the reflecting element is disposed within the chassis, the projection beam is adapted to transmit towards the top portion of the chassis via a reflection of the reflecting element.

* * * * *